United States Patent
Smith et al.

(10) Patent No.: US 6,457,869 B1
(45) Date of Patent: Oct. 1, 2002

(54) WHEEL MOUNTING WITH AXLE-MOUNTED SENSOR

(75) Inventors: Douglas H. Smith, Akron, OH (US); Lloyd William Sparrow; Geoffrey William Branfield, both of Northampton (GB)

(73) Assignee: The Timken Company, Canton, OH (US)

( * ) Notice: Subject to any disclaimer, the term of this patent is extended or adjusted under 35 U.S.C. 154(b) by 21 days.

(21) Appl. No.: 09/665,199

(22) Filed: Sep. 18, 2000

Related U.S. Application Data

(63) Continuation-in-part of application No. 09/491,232, filed on Jan. 25, 2000, now abandoned.

(51) Int. Cl.[7] .............................................. F16C 19/00
(52) U.S. Cl. ...................................................... 384/448
(58) Field of Search ................................ 384/448, 544, 384/589, 484

(56) References Cited

U.S. PATENT DOCUMENTS

| | | | |
|---|---|---|---|
| 3,500,091 A | 3/1970 | Jones | 310/168 |
| 5,022,659 A | 6/1991 | Otto | 277/309 |
| 5,458,420 A | 10/1995 | Otto | 384/448 |
| 5,725,316 A | 3/1998 | Barbero et al. | 384/448 |
| 5,893,648 A | 4/1999 | Smith | 384/448 |

FOREIGN PATENT DOCUMENTS

| | | |
|---|---|---|
| DE | 4427098 | 1/1996 |
| DE | 19535272 | 4/1997 |
| EP | 0822413 | 2/1998 |
| FR | 2639412 | 5/1990 |

*Primary Examiner*—Thomas R. Hannon
(74) *Attorney, Agent, or Firm*—Polster, Lieder, Woodruff & Lucchesi, LC

(57) ABSTRACT

A wheel mounting includes an axle provided with a spindle, a hub located around the spindle, and an antifriction bearing located between the spindle and the hub for enabling the hub to rotate on the spindle with minimal friction. The axle also has a cylindrical ring seat located beyond its spindle and a shoulder located between the spindle and the ring seat. The ring seat has a stop located along it. The bearing has a cone located around the spindle, with its back face being against the shoulder, a cup located in the hub, and tapered rollers located between tapered raceways on the cone and cup. Beyond the large end of its raceway the cup is fitted with an excitor ring having a radial wall at the inboard end of the bearing. The ring seat carries a mounting ring having an axial wall provided with a formation that bears against the stop on the seat and an end edge that is against the back face of the inboard cone. Indeed, the axial wall is compressed between the back face of the inboard cone and the stop, so that the formation on the axial wall bears tightly against the stop on the ring seat. This fixes the mounting ring firmly in position axially with respect to the radial wall on the excitor ring. The mounting ring carries a sensor which is presented toward the radial wall of the excitor ring. The sensor produces a pulsating signal when the excitor ring rotates, and the frequency of that signal reflects the angular velocity of the hub.

20 Claims, 4 Drawing Sheets

WHEEL MOUNTING WITH AXLE-MOUNTED SENSOR

CROSS-REFERENCE TO RELATED APPLICATIONS

None.

STATEMENT REGARDING FEDERALLY SPONSORED RESEARCH OR DEVELOPMENT.

Not applicable.

RELATED APPLICATION

This application is a continuation-in-part of U.S. patent application Ser. No. 09/491,232 of Douglas H. Smith entitled Wheel Mounting With Axle-Mounted Sensor, which application was filed Jan. 25, 2000 now abandoned.

BACKGROUND OF THE INVENTION

This invention relates in general to a wheel mounting and, more particularly, to a wheel mounting having an axle-mounted sensor for measuring angular velocity.

An automotive vehicle that is equipped with an antilock braking system requires sensors to monitor the angular velocity of its individual wheels, so that when a wheel loses traction during the application of the brakes, the sensor at that wheel will detect a loss of velocity. The system actuates the brake at that wheel intermittently, thus enabling the vehicle to stop more efficiently and with better control. Traction control systems require sensors at the driven wheels to detect when one of the driven wheels loses traction and spins. The traction control system diverts the torque to the wheel which best exerts the tractive effort.

The typical sensor system for a vehicle has an excitor ring for each of the front wheels, and often for each of the rear wheels as well. Each excitor ring rotates with the road wheel with which it is identified. In addition, the system has a separate sensor for each excitor ring. Each sensor is mounted in a fixed position opposite its excitor ring with a small gap between the two. The sensor produces a signal which reflects the angular velocity of the excitor ring and the road wheel with which the ring rotates. The gap should remain within close tolerances and certainly should not exceed a prescribed dimension. It should also remain uniform during the operation of the bearing. Many sensor systems do not meet those requirements. Some manufacturers integrate the excitor rings and sensors into the bearings. Others fit the excitor rings to the wheel hubs and have the sensors mounted externally of the bearings. The former complicates the assembly of the bearings, whereas the latter complicates the installation of the hubs and renders the sensors vulnerable to displacement and damage.

One type of sensor system is installed on the axle which carries the wheel bearing, either with the installation of the bearing or prior to it. In any event, the carrier for the sensor and the bearing unite with a snap-type engagement, but this requires a modification of one of the bearing races.

SUMMARY OF THE INVENTION

The present invention resides in a wheel mounting including an axle, a hub located around a spindle on the axle, and an antifriction bearing located between the spindle and the hub. The axle also has an enlarged ring seat provided with a stop. The bearing has an inner race provided with a back face that is held firmly against the shoulder on the axle. The hub, on the other hand, carries an excitor ring which rotates with it. The ring seat on the axle carries a mounting ring which extends axially between the back face of the inner race and the stop along the seat. The mounting ring, in turn, carries a sensor which monitors the excitor ring, producing a signal which reflects the angular velocity of the excitor ring and hub. The invention also resides in a method of assembling the wheel mounting.

DETAILED DESCRIPTION

Figure 1:
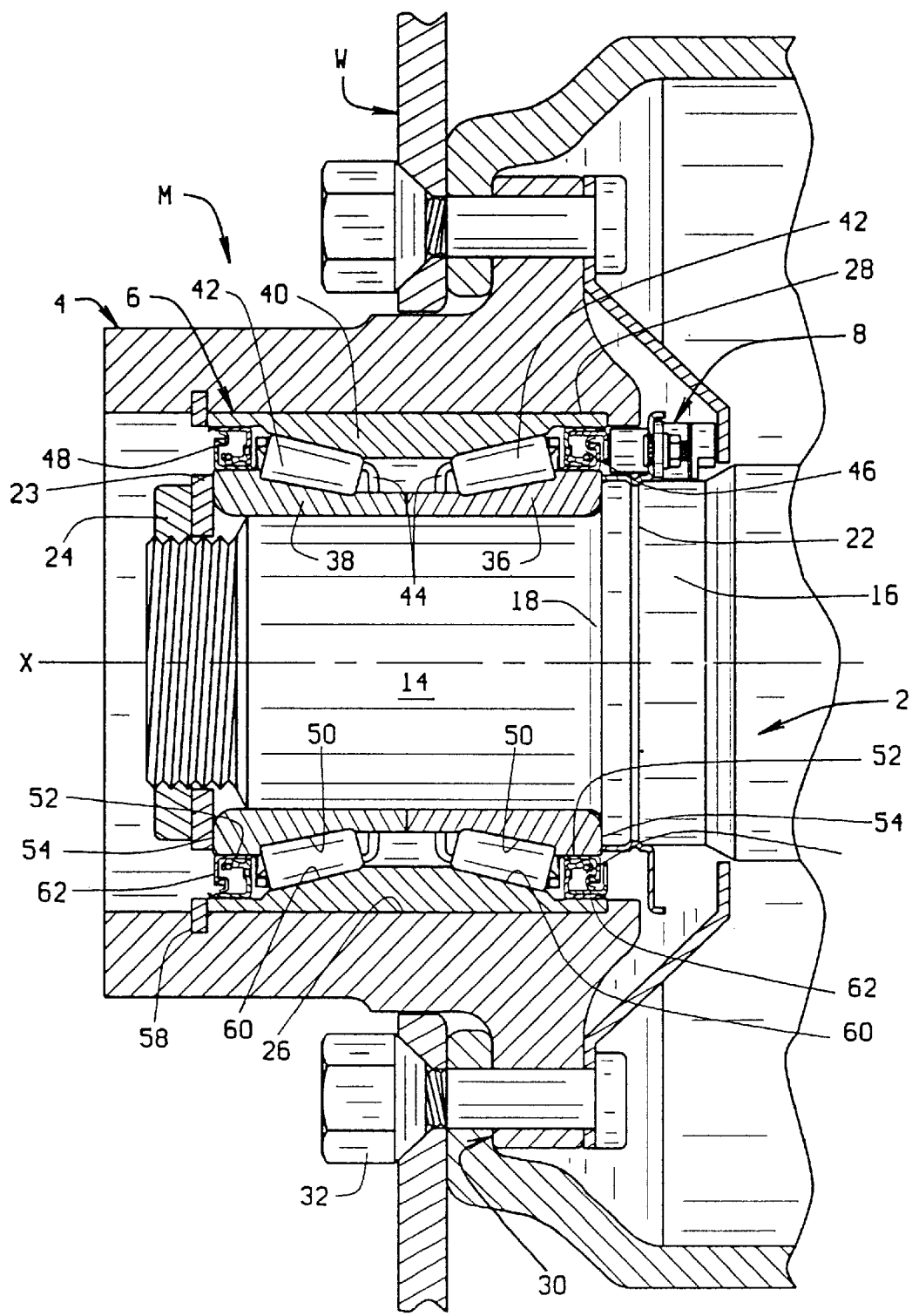
FIG. 1 is a longitudinal sectional view of a wheel mounting constructed in accordance with and embodying the present invention.

Referring now to the drawings, a mounting M (FIG. 1) couples a road wheel W to the suspension system of an automotive vehicle and enables processors on the automotive vehicle to detect changes in the angular velocity of the road wheel W about its axis X of rotation. The mounting M includes an axle 2 which is attached to the suspension system of the vehicle, a hub 4 to which the road wheel W is secured, and a bearing 6 located around the axle 2 and within the hub 4 to enable the hub 4 to rotate on the axle 2 and about the axis X with minimal friction. In addition, the mounting M includes a sensing system 8 which produces an electrical signal that reflects the angular velocity of the hub 4.

The axle 2 at its end has a spindle 14 (FIG. 1) of generally cylindrical configuration. At its inboard end the spindle 14 merges into a cylindrical ring seat 16 of greater diameter, there being a radially directed shoulder 18 between the spindle 14 and the ring seat 16. Actually, the seat 16 is cylindrical for the most part, but along the shoulder 18 it has a slightly beveled surface 20 (FIG. 2) which within a short distance enlarges to the full diameter of the seat 16. Beyond the shoulder 18 and the beveled surface 20 (FIG. 2) the ring seat 16 contains a depression in the form of an annular groove 22 which opens out of its cylindrical surface and has beveled side walls. The outboard end of the spindle 14 is threaded and fitted with a washer 23 as well as a nut 24 (FIG. 1) which engages the threads. The bearing 6 fits over the spindle 14 where it is captured between the shoulder 18, on one hand, and the washer 23 and nut 24, on the other. The sensing system 8 for the most part encircles the cylindrical seat 16.

The hub 4 surrounds the axle 2 at its spindle 14 and contains a bore 26 (FIG. 1) which receives the bearing 6. The bore 26 at its inboard end terminates at a shoulder 28, whereas its outboard end opens out of the corresponding end of the hub 4. In addition, the hub 4 has a radially directed flange 30 to which the road wheel W is attached with lug nuts 32.

The bearing 6 includes (FIG. 1) an inner race in the form of an inboard cone 36 and an outboard cone 38 which fit over the spindle 14 of the axle 2, an outer race in the form of a double cup 40 which fits into the bore 26 of the hub 4, and rolling elements in the form of tapered rollers 42 which are organized into two rows, one around the inboard cone 36 and the other around the outboard cone 38. Moreover, the bearing 6 has cages 44—one for each row of rollers 42—and they maintain the proper spacing between the rollers 42 and hold them on their respective cones 36 and 38 when the cones 36 and 38 are withdrawn from the cup 40. Finally, the bearing 6 at its inboard end is fitted with a seal 46 and at its outboard end with a seal 48.

Each cone 36 and 38 has a tapered raceway 50 (FIG. 1) that is presented outwardly away from the axis X and toward the cup 40 and also a thrust rib 52 at the large end of the raceway 50. The thrust rib 52 extends out to a back face 54 which is squared off with respect to the axis X. The back face 54 of the inboard cone 36 bears against the shoulder 18 on the axle 2, but its diameter exceeds the diameter of the ring seat 16, so the back face 54 and thrust rib 52 of the inboard cone 36 project radially beyond the ring seat 16 (FIG. 2). The nut 24 at the opposite end of the spindle 14 is tightened against the washer 23 which in turn bears against back face 54 of the outboard cone 38. Thus, the two cones 36 and 38—and indeed, the entire bearing 6—are captured between the shoulder 18 and the nut 24.

The double cup 40 fits into the bore 26 of the hub 4 (FIG. 1) with an interference fit. One of its ends bears against the shoulder 28 at the end of the bore 26, while its other end is presented opposite a snap ring 58 or some other restraining device at the outboard end of the bore 26. The double cup 40 has two tapered raceways 60 that are presented inwardly toward the axis X, the one surrounding the raceway 50 on the inboard cone 36 and the other surrounding the raceway 50 on the outboard cone 38. The cup raceways 60 at their large ends open into end bores 62 which extend out to the ends of the cup 40. The thrust ribs 54 of the two cones 36 and 38 are within the end bores 62 of the cup 40.

Figure 2:
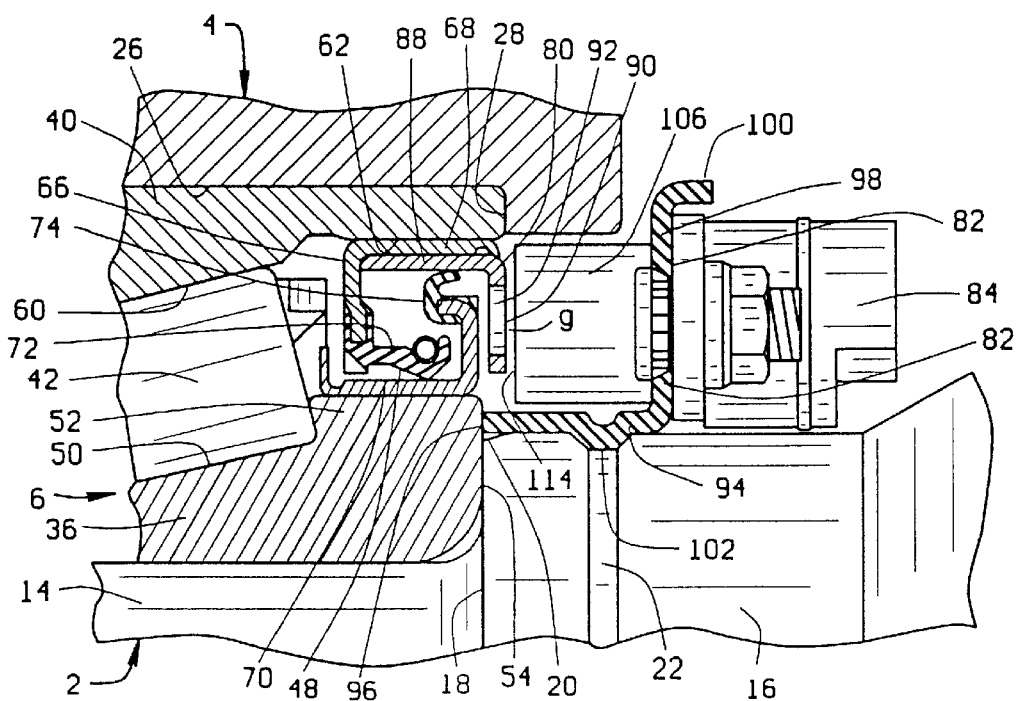
FIG. 2 is an enlarged sectional view of the mounting at its sensor unit.

One row of tapered rollers 42 lies between the tapered raceway 50 on the inboard cone 36 and the encircling tapered raceway 60 of the cup 40 (FIG. 1). The tapered side faces of the rollers 42 contact those raceways 50 and 60, while their large end faces bear against the thrust rib 52. Indeed, the thrust rib 52 prevents the rollers 42 from moving up the raceways 50 and 60 and out of the inboard end of the bearing 6. The other row of tapered rollers 42 lies between and contacts the raceway 50 on the outboard cone 38 and the surrounding raceway 60 of the cup 40. The thrust rib 52 on that cone 38 prevents those rollers 42 from migrating out of the outboard end of the bearing 6. The rollers 42 of the two rows are on apex, meaning that the envelopes of the rollers 42 in the inboard row have their apices at a common point along the axis X, while the envelopes for the rollers 42 of the outboard row have their apices at another common point on the axis X. The rollers 42 of the two rows, with their large end faces presented toward the ends of the bearing 6, enable the bearing 6 to take thrust loads in both axial directions. The two cones 36 and 38 abut midway between the ends of the bearing 6, with spacing between the raceways 50 on the two cones 36 and 38 being such that the bearing 6 preferably operates in a condition of slight preload. In that condition, no radial or axial free motion develops between the cup 40 and the two cones 36 and 38.

The seals 46 and 48 fit into the annular spaces between the thrust ribs 52 on the two cones 36 and 38 and the surrounding cylindrical surfaces of the end bores 62 in the cup 40 (FIG. 1). Here they establish barriers which prevent contaminants from entering the annular spaces between the raceways 50 and 60 on the cones 36 and 38 and cup 40, respectively. They also keep grease or some other fluent lubricant in that annular space. The seal 46 at the inboard end of the bearing 6 includes (FIG. 2) an outer case 66 which is stamped from metal and has an axially directed wall 68 which is pressed into that end bore 62 of the cup 40 which opens out of the inboard end of the bearing 6. The seal 46 also includes an inner case or shield 70 which is pressed over the thrust rib 52 on the inboard cup 40. It too is preferably a metal stamping. The outer case 66 carries an elastomeric seal element 72 which is biased against the shield 70. The shield 70 carries an elastomeric seal element 74 which is directed outwardly toward the axial wall 68 of the outer case 66. U.S. Pat. No. 5,458,420 discloses a seal that is suitable for use as the inboard seal 46.

The seal 48 at the outboard end of the bearing 6 may be much the same (FIG. 1). Its case 66 fits into the end bore 62 at that end, while its shield 70 fits over the thrust rib 52 on the outboard cone 38. When the axle 2 is solid or its end is otherwise closed and a cap closes the end of the hub 4, a seal 48 may not be required at the outboard end of the bearing 6.

The sensing system 8 includes (FIGS. 2 & 4) an excitor ring 80 which is integrated into the inboard seal 46, a mounting ring 82 which fits over the cylindrical seat 16 of the axle 2, and a sensor 84 which is carried by the ring 82 where it is presented opposite the excitor ring 80. The sensor 84 remains stationary while the excitor ring 80 rotates in front of it.

The excitor ring 80 is preferably formed as a metal stamping. It has an axial wall 88 (FIGS. 2 & 4) which fits into the axial wall 68 for the outer case 66 of the inboard seal 46, there being an interference fit between the two. At the very end of the cup 40 the axial wall 88 merges into a radial wall 90 which projects inwardly toward the thrust rib 52 on the inboard cone 36, but terminates short of the outer surface on the rib 52. The radial wall 90 contains apertures 92 which are elongated in the radial direction and are arranged at equal circumferential intervals to form discontinuities in the ring 80. The radial wall 90 lies inboard from the shield 70 for the inboard seal 46 and, indeed, rotates in front of the shield 70 when the wheel W revolves on the mounting M.

The mounting ring 82 is likewise formed as a stamping from a suitable metal, preferably steel. It has an axial wall 94 (FIGS. 2 & 4) which fits over the cylindrical ring seat 16 on the axle 2 with an interference fit, it being long enough to extend from the shoulder 18, where it has a free end edge 96, past the annular groove 22, so that the axial wall 94 covers the groove 22. Beyond the groove 22, the axial wall 94 merges into a radial wall 98 which extends radially outwardly from the axle 2, so that it is presented opposite the radial wall 90 of the excitor ring 80, yet is spaced from that radial wall 90. At its periphery, which lies radially beyond the cup end bore 62, the radial wall 98 merges into a short axially directed lip 100 which rigidities the radial wall 98.

The free end edge 96 of the axial wall 94 on the mounting ring 82 bears snugly against the back face 54 of the inboard cone 36 which in turn bears against the shoulder 18 on the axle 2 (FIG. 2). Thus, the end edge 96 of the axial wall 94 lies flush with the shoulder 18. But, the axial wall 94 is constrained from migrating away from the back face 54 of the inboard cone 36 by a succession of dimples or detents 102 which project into the annular groove 22 that opens out of the cylindrical seat 16. The detents 102, which are arranged at equal circumferential intervals, constitute a formation on the wall 94. Actually, the distance between the detents 102 and the end edge 96 on the mounting ring 82 as manufactured exceeds the distance between the shoulder 18 and the annular groove 22 of the axle 2, so that when the mounting ring 82 is initially installed on the cylindrical ring seat 16 of the axle 2, the axial wall 94 projects over the shoulder 18, there being an offset "y" (FIG. 3) between the end edge 96 and the shoulder 18.

But, the inboard cone 36 at its back face 54 bears against the end edge 96 and displaces the axial wall 94 further onto the cylindrical seat 16 until the end edge 96 and shoulder 18 are flush. The groove 22, and specifically its back edge, serves as a stop and resists further displacement of the axial wall 94 on the seat 16. The displacement places that region of the axial wall 94 that lies between the end edge 96 and the detents 102 in a state of compression and further deforms the detents 102 in the groove 22. The compression and deformation accommodate the slight displacement of the axial wall 94, and the axial wall 94 remains trapped in a state of compression between the back face 54 of the inboard cone 36 and the back edge of the groove 22. This entrapment firmly and precisely fixes the position of the mounting ring 82 on the cylindrical seat 16 of the axle 2.

The sensor 84 has a head 106 (FIGS. 2 & 4) which fits through the radial wall 98 of the mounting ring 82 and a mounting tab 108 which projects laterally beyond the head 106. The tab 108 bears against the back of the radial wall 98, and the sensor 84 is secured firmly to the mounting ring 82 by a threaded stud 110 which projects from the radial wall 98 and through the tab 108, and by a nut 112 which engages the stud 110 and is tightened down against the tab 108. The head 106 terminates at an end face 114 which is presented toward the apertured radial wall 92 on the excitor ring 80, there being a slight gap "g" (FIG. 2) between the two. The gap "g" is established with considerable precision and remains essentially constant owing to the initial disposition of the free edge 96 of the axial wall 92 beyond the shoulder 28 and its subsequent displacement to its final position flush with the shoulder 18.

The sensor 84 creates a magnetic field in the region of the radial wall 90 for the excitor ring 80, and as the excitor ring 80 rotates the edges of the apertures 92 within its radial wall 90 disrupt the magnetic field. The sensor 84 detects the disruptions and produces an electrical signal, the frequency of which reflects the angular velocity of the excitor ring 80.

Figure 3:
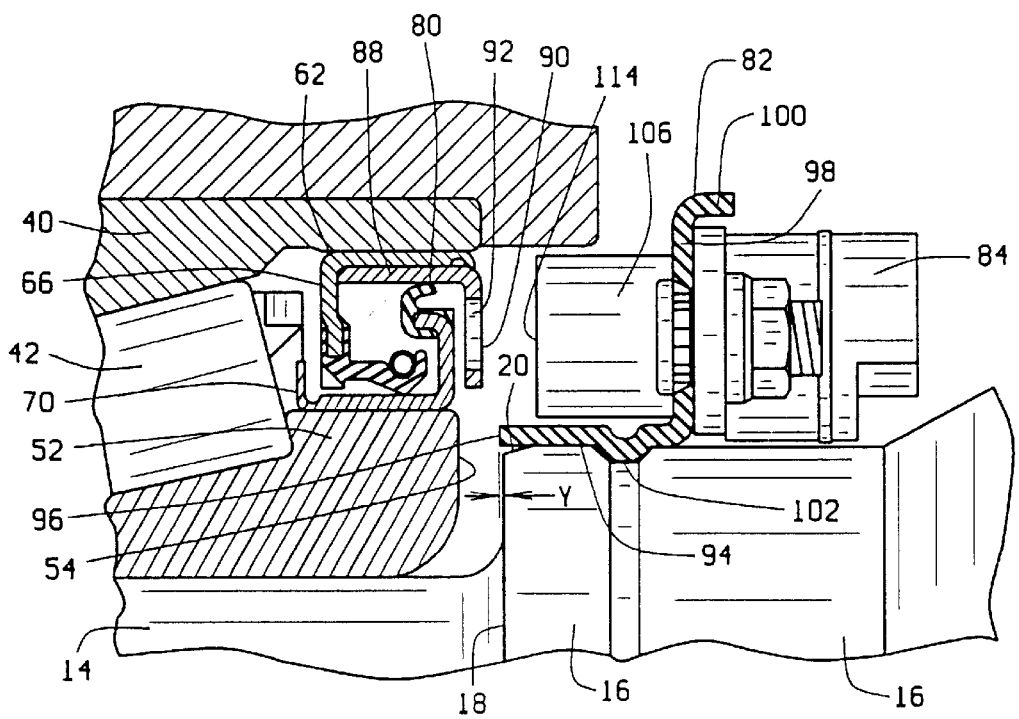
FIG. 3 is an enlarged sectional view of the mounting during assembly and prior to advancement of the bearing to its final position.

To assemble the mounting M, the mounting ring 82 and sensor 84 of the sensor unit 8 are first installed on the axle 2. To this end, the mounting ring 82, with the sensor 84 attached to it, is advanced over the spindle 14 of the axle 2 with the radial wall 98 leading. When the axial wall 94 of the mounting ring 82 reaches the shoulder 18, the axial wall 94 is aligned with the cylindrical portion of the seat 16 and enough force is exerted on it to drive it over the beveled surface 20 and onto the cylindrical portion of the seat 16. When the detents 102 reach the shoulder 18, they likewise pass over beveled surface 20 and onto the cylindrical seat 16, the axial wall 94 deforming elastically to accommodate their movement over the seat 16. After a short distance the detents 102 reach the groove 22 and snap into it (FIG. 3). Even so, the interference fit remains between the axial wall 94 and the cylindrical seat 16. With the detents 102 in the groove 22, the end edge 96 of the axial wall 94 for the mounting ring 82 lies slightly ahead of the shoulder 18, there being the offset "y" between the two.

Figure 4:
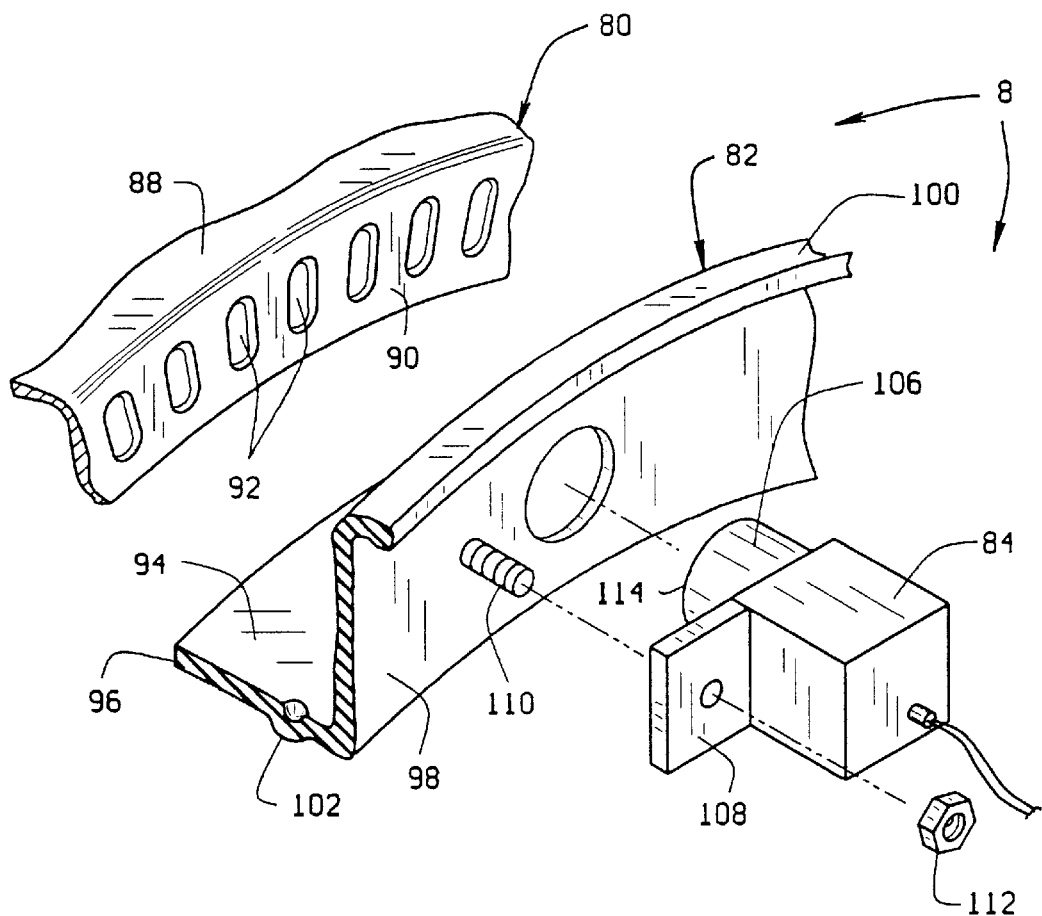
FIG. 4 is a fragmentary exploded perspective view of the sensor unit for the mounting.

Next the bearing 6 is installed in the hub 4 by passing its cup 40 into the hub bore 26 and, thereafter, retaining it with the snap ring 58. Then the bearing 6 and hub 4 are installed as a unit on the spindle 14 of the axle 2. To this end, the inboard cone 36, and the outboard cone 38, while within the cup 40 and with the rollers 42 and seals 46 and 48 in place, are advanced over the spindle 14 with the inboard cone 36 leading (FIG. 3). The advance continues until the back face 54 of the inboard cone 36 reaches the end edge 96 on the mounting ring 82. At this point, the washer 23 is installed over the threaded portion of the spindle 14, and the nut 24 is engaged with the threads on the end of the spindle 14 and tightened down to compress the washer 23 between the nut 24 and against the back face 54 of the outboard cone 38. This drives the two cones 36 and 38 toward the shoulder 18 from which the spindle 14 projects. The nut 24 is advanced over the threads at the end of the spindle 14 until the back face 54 of the inboard cone 36 comes snugly against the shoulder 18 (FIG. 4). The cup 40 and the excitor ring 80 at its inboard end likewise advance, with the apertured radial wall 90 of the excitor ring 80 assuming a predetermined axial position with respect to the axle 2 when the back face 54 of the inboard cone 36 reaches the shoulder 18.

As the back face 54 of the inboard cone 36 advances under the force exerted by the nut 24, it bears against the end edge 96 on the axial wall 94 of the mounting ring 82 and forces the axial wall 94 farther onto the cylindrical ring seat 16. The detents 102 resist this last increment of advance, but deform against the back edge of the groove 22 to accommodate it, all without climbing out of the groove 22. Thus, when the back face 54 of the inboard cone 36 reaches the shoulder 18, the axial wall 94 of the mounting ring 82 lies trapped firmly between that back face 54 and the groove 22 (FIG. 2). This positions the sensor 84 with the end face 114 of its head 106 located a prescribed distance from the apertured radial wall 90 in the excitor ring 80, and that distance represents the gap "g".

In the operation of the mounting M, the hub 4 rotates around the axle 2 where it is confined on the axle 2 both radially and axially by the bearing 6. The sensor 84 detects the apertures 92 moving past the end face 114 of its head 106 and produces a pulsating signal in response to the rotation of the excitor ring 80. The frequency of that signal reflects the angular velocity of the wheel W. The size of the gap "g" between the radial wall 90 of the excitor ring 80 and the end face 114 of the sensor 84 remains essentially constant, although it may vary slightly as a consequence of temperature changes, load and road conditions, and perhaps some end play in the bearing 6. Even so, the variance is not enough to adversely affect the operation of the sensor 84. After all, the sensor 84 remains in a fixed axial position on the axle 2, because the mounting ring 82 to which it is attached is firmly trapped in a state of compression between the back face 54 of the inboard cone 36 and the annular groove 22.

In lieu of the individual detents 102, the axial wall 94 of the mounting ring 82 may have a continuous rib which projects inwardly from the axial wall 94.

Figure 5:
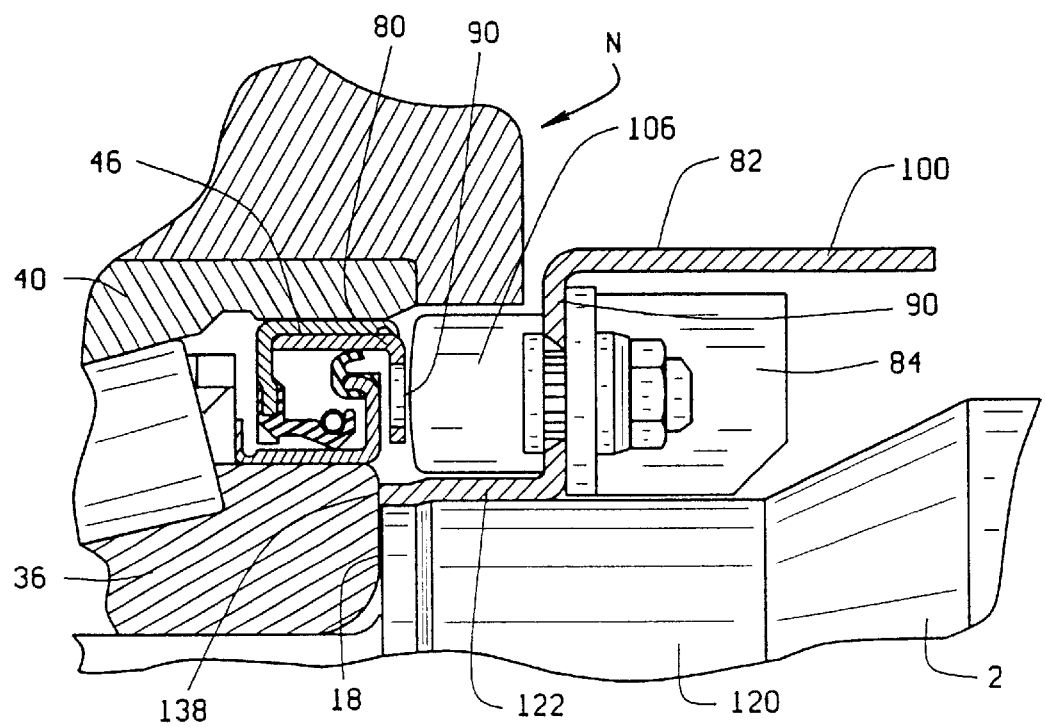
FIG. 5 is a fragmentary sectional view of a modified wheel mounting.

A modified mounting N (FIGS. 5 & 6) is quite similar to the mounting M, but on its axle 2 it has a ring seat 120 that differs from the ring seat 16 and likewise on its mounting ring 82 has an axial wall 122 that differs from the axial wall 94. Indeed, the axial wall 122 conforms to the ring seat 120. Otherwise, the mounting N is essentially the same as the mounting M.

Considering the ring seat 120 first, it has large and small surfaces 124 and 126, both of which are cylindrical. The two cylindrical surfaces 124 and 126 merge at a beveled intervening surface 128 which is quite short and lies at an angle between 10° and 40° with respect to the axis X, and preferably at 20°. The smaller surface 124 leads away from the shoulder 18, so the large surface 126 is separated from the shoulder by the smaller surface 124 and the beveled surface 128. Thus, in a sense the beveled surface 128 is presented toward the bearing 6. It forms a stop along the ring seat 120. The shoulder 18 and small surface 124 meet at a curved corner 130 of small radius.

The axial wall 122 on the mounting ring 82 for the mounting N has a small diameter region 132 and a large diameter region 134 with a step-like transition 136 between the two regions. Like the intervening surface 128 on the ring seat 120, the transition 136 is beveled, but it lies at a lesser angle with respect to the axis X than does the surface 128, preferably at 15° when the beveled surface 128 is 20°. The small region 132 runs out to an end edge 138, while the large region 134 merges with the radial wall 90 to which the sensor 84 is attached. When the mounting ring 82 is installed on the axle 2, the small region 132 of the axial wall 122 fits over the small surface 124 of the ring seat 120 with an interference fit, while the large region 134 fits over the large surface 126, again with an interference fit. The transition, which is a formation on the wall 122, bears against the beveled intervening surface 128.

Figure 6:
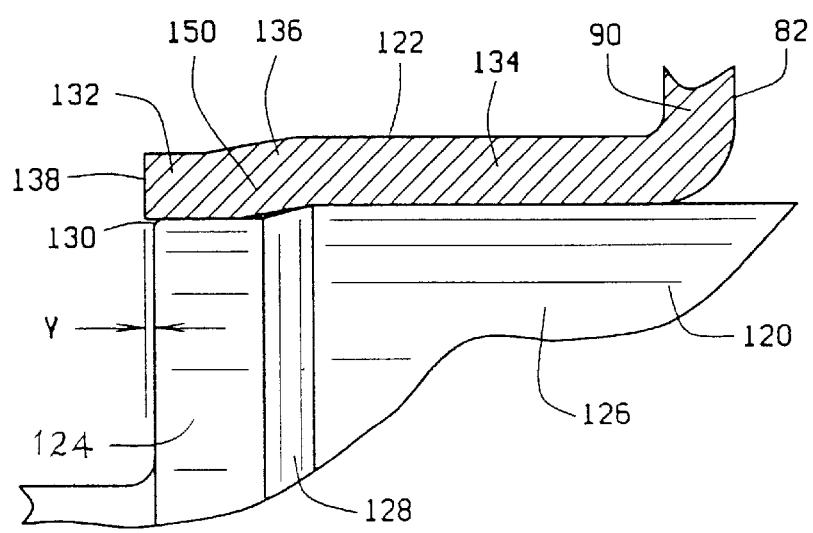
FIG. 6 is a sectional view, enlarged, of the modified mounting at the beveled stop on its ring seat and prior to advancement of the bearing to its final position.

During the assembly of the mounting N, the mounting ring 82 is installed over on axle 2 by forcing the axial wall 122 of the ring 82 over the ring seat 120 of the axle 2. Actually, the mounting ring 82 initially advances quite easily over the seat 120 because a clearance exists between the large region 134 of its axial wall 122 and the small surface 124 of the ring seat 120. However, once the axial wall 122 encounters the beveled intervening surface 128, an axially directed force is applied to the axial wall 122 at its end edge 138. The large region 134 moves up the beveled surface 128 and onto the large surface 126 over which it continues to advance, with the force being enough to overcome the interference fit between the large surface 126 of the seat 120 and the large region 134 of the wall 122. When the transition 136 arrives at curved corner 130, the axial force increases to drive the transition 136 over the corner 130 and the small region 132 over the small surface 124 of the ring seat 120. The advancement continues until the transition 136 in the axial wall 122 reaches the stop formed on the ring seat 120 by the beveled intervening surface 128. At this juncture the end edge 138 of the axial wall 122 lies slightly beyond the shoulder 18 of the axle 2, there being an offset "y" between the edge 138 and the shoulder 18 (FIG. 6).

Once the axial wall 122 of the modified mounting ring 82 is fully seated on the ring seat 120 of the axle 2, the bearing 6, with the hub 4 fitted to it, is installed over spindle 14. When the back face 54 of the inboard cone 36 reaches the end edge 138 of the axial wall 122 for the mounting ring 82, the washer 23 and nut 24 are installed on the threaded end of the spindle 2. The nut 24 is tightened sufficiently to drive the back face 54 of the inboard cone 36 against the shoulder 18 on the axle 2. The inboard cone 36 in turn drives the end edge 138 on the axial wall 122 of the ring 82 back until the edge 138 lies flush with the shoulder 18. This lodges the transition 136 in the wall 122 firmly against beveled intervening surface 128 on the ring seat 120, compressing the small region 132 of the axial wall 122 between the back face 54 of the inboard cone 36 and the beveled surface 128 on the ring seat 120 and causing the transition 136 to ride slightly up the beveled surface 128. Thus, the mounting ring 82 is captured both radially and axially on the axle 2, and the gap "g" between the end face 114 of the sensor 84 and the radial wall 90 of the excitor ring 80 remains essentially constant.

In either of the mountings M or N, the hub 4 may be supported on two single row bearings mounted in opposition, preferably in the indirect configuration, and preferably set with a slight preload, this instead of the double row bearing 6. Moreover, the cup 40 may be integrated into the hub 4, so that the outer raceways 60 are directly on the hub 4. The axle 2 may support driven or nondriven wheels and wheels that are fixed in direction or wheels mounted to pivot so as to steer the vehicle.

What is claimed is:

1. A wheel mounting comprising: an axle having a spindle and a larger ring seat located beyond the spindle and a shoulder between the spindle and seat, the seat having small and large surfaces in that order from the shoulder and also a beveled intervening surface between the small and large surfaces, with the intervening surface forming on the seat a stop that is spaced from the shoulder; a hub located around the spindle; an antifriction bearing located between the axle and the hub for enabling the hub to rotate on the axle about an axis of rotation, the bearing including an inner race located around the spindle and having an inner raceway presented outwardly away from the axis and a back face presented toward the shoulder of the axle and projecting radially beyond the seat, an outer raceway located in the hub and presented inwardly toward the axis and surrounding the inner raceway of the inner race, and rolling elements located between and contacting the raceways; a mounting ring located around the ring seat on the axle and having an end that is against the back face of the inner race, the mounting ring being confined axially by the back face of the inner race and the stop on the seat; an excitor ring carried by the hub and fixed in position with respect to the hub; and a sensor mounted on the mounting ring and being presented toward the excitor ring, the sensor having the capacity to detect rotation of the excitor ring and to produce a signal that reflects the angular velocity of the excitor ring.

2. A wheel mounting comprising: an axle having a spindle and a larger ring seat located beyond the spindle and a shoulder between the spindle and seat, the seat having a stop on it, with the stop being spaced from the shoulder; a hub located around the spindle; an antifriction bearing located between the axle and the hub for enabling the hub to rotate on the axle about an axis of rotation, the bearing including an inner race located around the spindle and having an inner raceway presented outwardly away from the axis and a back face presented toward the shoulder of the axle and projecting radially beyond seat, an outer raceway located in the hub and presented inwardly toward the axis and surrounding the inner raceway of the inner race, and rolling elements located between and contacting the raceways; a mounting ring located around the ring seat on the axle and having an end that is against the back face of the inner race, the mounting ring being compressed between the back face of the inner race and the stop on the seat so that in the absence of the inner race, the mounting ring will project beyond the shoulder on the axle; an excitor ring carried by the hub and fixed in position with respect to the hub; and a sensor mounted on the mounting ring and being presented toward the excitor ring, the sensor having the capacity to detect rotation of the excitor ring and to produce a signal that reflects the angular velocity of the excitor ring.

3. A mounting according to claim 2 wherein the stop on the ring seat is a depression which opens out of the ring seat; and the mounting ring has a detent which projects into the depression.

4. A mounting according to claim 2 wherein the bearing further includes an outer race that is located within the hub and has the outer raceway on it.

5. A mounting according to claim 4 and further comprising a seal located between the inner and outer races and having a case carried by the outer race; and wherein the excitor ring is mounted on the case of the seal.

6. A wheel mounting comprising: an axle having a spindle at its end and a ring seat of greater diameter located beyond the spindle and a shoulder located between the spindle and the ring seat, the axle further having a stop which is spaced axially from the shoulder; a hub located around the spindle on the axle; an antifriction bearing located between the spindle and the hub for enabling the hub to rotate on the axle about an axis of rotation, the bearing including a cone having a tapered raceway presented outwardly away from the axis and a back face located beyond the large end of the raceway, the back face being against the shoulder on the axle; the bearing also having a tapered raceway that is presented inwardly toward the axis and surrounds the raceway on the inner race, the bearing further having tapered rollers located between and contacting the raceways; a mounting ring having an axial wall located around the ring seat on the axle, the axial wall having an end edge that is against the back face of the cone and a formation which is against the stop, such that the axial wall of the mounting ring is compressed between the back face of the cone and the stop on the ring seat, and the mounting ring cannot shift axially on the cylindrical seat; an excitor ring carried by the hub and having a radially directed wall that is presented toward the mounting ring, the radial wall having discontinuities; and a sensor attached to the mounting ring and having an end face which is presented toward the radial wall of the excitor ring, the sensor having the capacity to detect the discontinuities in the excitor ring when the excitor ring rotates past it and to produce, in response to the movement of the discontinuities past it, a signal which reflects the angular velocity of the excitor ring and the hub.

7. A mounting according to claim 6 wherein the mounting ring has a generally radial wall that is connected to the axial wall and extends away from the cylindrical ring seat; and wherein the sensor is attached to the radial wall of the mounting ring.

8. A mounting according to claim 6 wherein the stop is a depression in the cylindrical ring seat.

9. A mounting according to claim 8 wherein the stop is an annular groove that opens out of the ring seat between the ends of the axial wall of the mounting ring.

10. A mounting according to claim 6 wherein the ring seat has small and large surfaces in that order from the shoulder and the stop is a beveled intervening surface between the small and large regions that are located respectively around the small and large surfaces of the ring seat and a transition located between the small and large regions with the transition being the formation that is against the stop formed by the intervening surface.

11. A mounting according to claim 6 wherein the bearing contains a seal that is located between the cone and the cup beyond the large ends of the tapered raceways; and wherein the excitor ring is integrated into the seal.

12. A mounting according to claim 6 wherein the axial wall of the mounting ring, in the absence of the cone from the spindle, will project beyond the shoulder on the axle, so that its end edge is offset from the shoulder.

13. A method of assembling the mounting of claim 12, said method comprising: pressing the axial wall of the mounting ring over the ring seat of the axle such that the end edge of the axial wall lies beyond the shoulder; advancing the cone of the bearing over the spindle and bringing its back face against the end edge on the axial wall of the mounting ring, whereby the back face is offset from the shoulder; urging the cone toward the shoulder with enough force to drive its back face against the shoulder and to drive the formation on the axial wall tightly into engagement with the stop.

14. A wheel mounting comprising: an axle having a spindle and a larger ring seat located beyond the spindle and a shoulder between the spindle and seat, the seat having a stop on it, with the stop being spaced from the shoulder; a hub located around the spindle; an antifriction bearing located between the axle and the hub for enabling the hub to rotate on the axle about an axis of rotation, the bearing including an inner race located around the spindle and having an inner raceway presented outwardly away from the axis and a back face presented toward the shoulder of the axle, an outer raceway located in the hub and presented inwardly toward the axis and surrounding the inner raceway of the inner race, and rolling elements located between and contacting the raceways; a mounting ring of generally uniform thickness located around the ring seat on the axle and having an end edge of corresponding thickness and a formation spaced from the end edge, the mounting ring being confined axially by the back face of the inner race and the stop on the seat; with its end edge being against the back face of the inner race and its formation being against the stop; an excitor ring carried by the hub and fixed in position with respect to the hub; and a sensor mounted on the mounting ring and being presented toward the excitor ring, the sensor having the capacity to detect rotation of the excitor ring and to produce a signal that reflects the angular velocity of the excitor ring.

15. A mounting according to claim 14 wherein the back face of the inner race for the bearing projects radially beyond the ring seat.

16. A mounting according to claim 15 wherein the ring seat has small and large surfaces in that order from the shoulder and also a beveled intervening surface between the small and large surfaces, and the intervening surface is the stop.

17. A mounting according to claim 15 wherein the ring seat has small and large surfaces in that order from the shoulder and also a beveled intervening surface between the small and large surfaces, and the intervening surface is the stop.

18. A mounting according to claim 15 wherein the mounting ring is compressed between the stop and the back face of the inner race, so that in the absence of the inner race, the mounting ring will project beyond the shoulder on the axle.

19. A mounting according to claim 14 wherein the back face of the inner race for the bearing projects radially beyond the seat; wherein the mounting ring has an axial wall that is fitted over the seat and has the end edge and formation on it, the mounting ring also having a radial wall that projects from the axial wall away from the seat; and wherein the sensor is attached to the radial wall of the mounting ring.

20. A method of assembling the mounting of claim 14, said method comprising; pressing the axial wall of the mounting ring over the ring seat of the axle such that the end edge of the axial wall lies beyond the shoulder; advancing the inner race of the bearing over the spindle and bringing its back face against the end edge on the axial wall of the mounting ring, whereby the back face is offset from the shoulder; urging the inner race toward the shoulder with enough force to drive its back face against the shoulder and to drive the formation on the axial wall tightly against the stop.

* * * * *